B. E. HENSLEY.
AUTOMOBILE LIFTER.
APPLICATION FILED AUG. 7, 1916.
1,234,759.
Patented July 31, 1917.
2 SHEETS—SHEET 2.
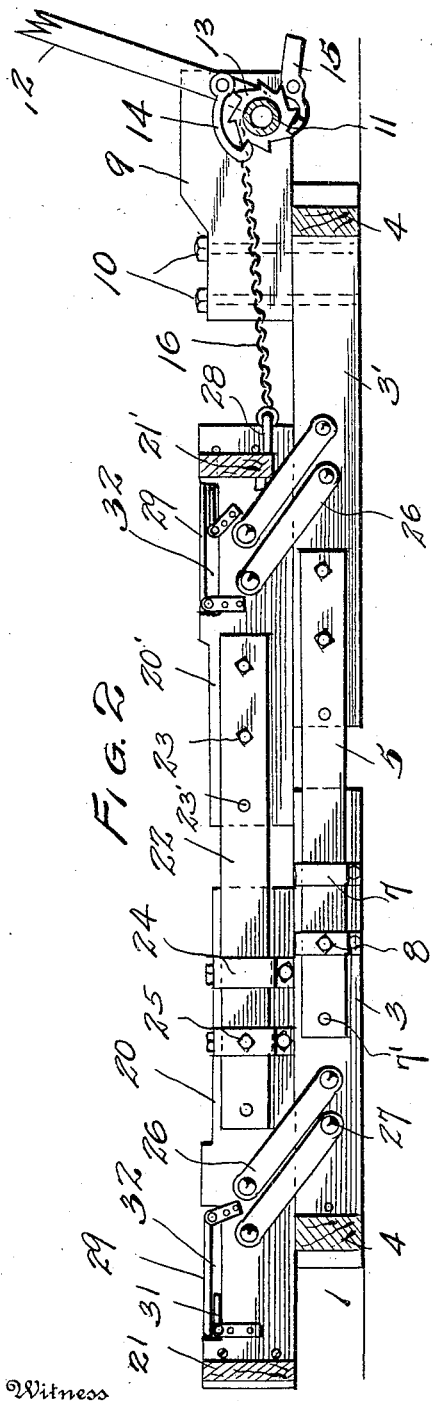
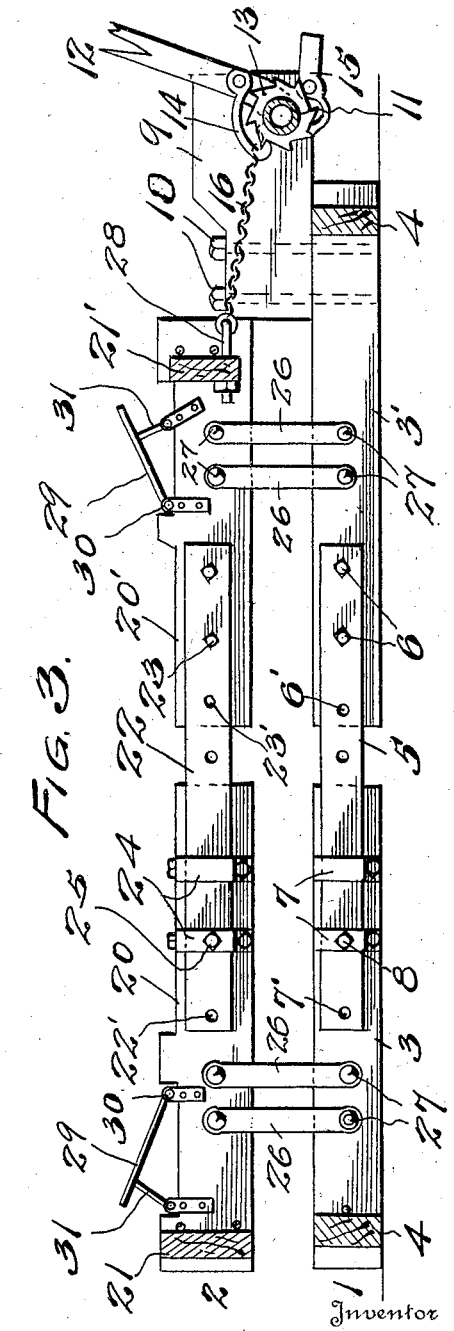
Witness
C. K. Davis
Inventor
BIRD E. HENSLEY
By Herman A. Phillips
Attorney

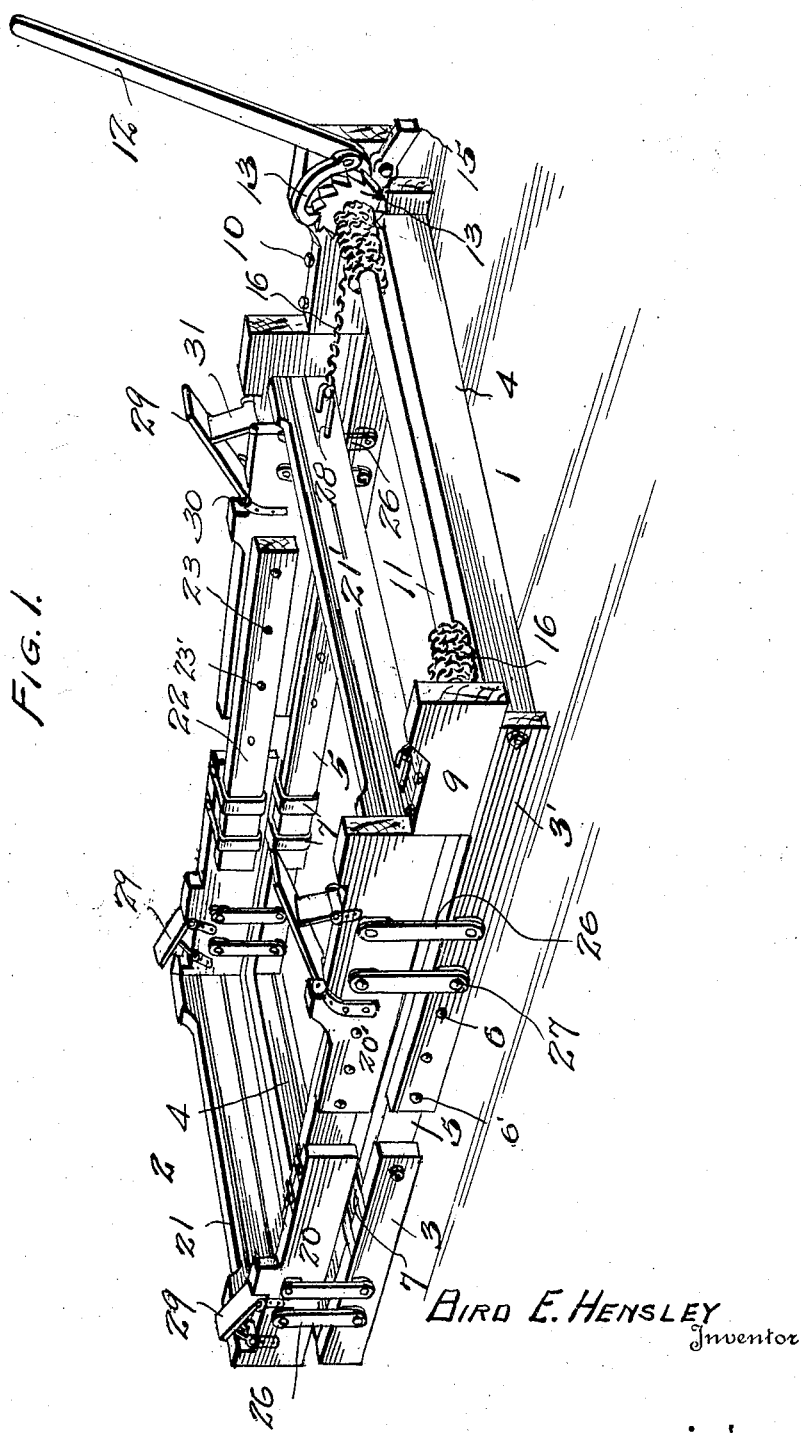

UNITED STATES PATENT OFFICE.

BIRD E. HENSLEY, OF SALEM, OREGON.

AUTOMOBILE-LIFTER.

1,234,759.  Specification of Letters Patent.  Patented July 31, 1917.

Application filed August 7, 1916. Serial No. 113,532.

*To all whom it may concern:*

Be it known that I, BIRD E. HENSLEY, a citizen of the United States of America, residing at Salem, in the county of Marion and State of Oregon, have invented new and useful Improvements in Automobile-Lifters, of which the following is a specification.

The present invention relates to improvements in automobile lifters, and is designed for the purpose of elevating or lifting, bodily, an automobile or other vehicle from the ground in order to take the load from the wheels, or for purposes of repair to the vehicle or wheels.

The primary object of the invention is the provision of a device for this purpose which may be operated with facility and despatch in lifting or lowering an automobile, and which is simple in construction, and comparatively inexpensive in cost and maintenance.

The invention consists in certain novel combinations and arrangements of parts including a base frame and a movable supporting frame and the operative connections and actuating means co-acting therewith as will be more fully disclosed hereinafter.

In the accompanying drawings I have illustrated one complete example of the physical embodiment of my invention constructed according to the best mode I have so far devised for the practical application of the principles of my invention. It will be understood however, that changes or alterations may be made in the device, within the scope of my claim, without departing from the spirit of my invention.

Figure 1 is a perspective view of an automobile lifter embodying the novel features of my invention.

Fig. 2 is a longitudinal, vertical sectional view of the device, in lowered position.

Fig. 3 is a view similar to Fig. 2 but with the device in raised position.

In the preferred embodiment of my invention as illustrated in the drawings I make the apparatus of two rectangular frames 1 and 2, the former a base frame and the latter movable with relation thereto so that it may be elevated and lift or raise an automobile from the ground. The frames are both shown as made of wood, but it will readily be understood that the entire apparatus may be constructed of metal if desired.

The base frame 1 is made up of four side bars arranged in pairs as 3 and 3', spaced apart and connected by the transverse braces or bars 4 4 at the ends of the frame. The two sections of the base frame thus formed are joined by a pair of connecting bars 5 5 which are secured to the bars 3' by bolts 6, passed through openings 6' in the connecting bars, and the other ends of the connecting bars 5 5 are passed through yokes 7 7 rigidly secured to the side bars 3. These connecting bars are provided with a series of perforations 6' and 7' so that the base frame may be lengthened or shortened and held rigid in adjusted position by bolts 6, and a set bolt 8 passed through one of the yokes 7 and into one of the perforations 7'.

At the end of the base frame a pair of bearing blocks 9 are bolted or secured by bolts 10, 10 to the frame, and between these blocks a drum 11 is journaled and is adapted to be rotated through the medium of a lever handle 13 loose on the drum, a rack wheel 13 rigid with the drum and a pawl 14 pivoted to the lever handle. Through this connection it is evident that the drum, which may for convenience be a metal pipe, is revolved clockwise and is prevented from reverse movement by the trip or detent 15 pivoted on the block 9 adjacent to the rack wheel which it engages. Through the medium of a pair of chains 16, which are wound on or unwound from the drum, the liftable frame 2 may be elevated with relation to the base frame 1.

The upper movable frame 2 is constructed quite similarly to the base frame and comprises two pairs of side bars 20 and 20', spaced apart and joined in pairs by the end transverse bars or braces 21 and 21'. The side bars are joined by connecting bars 22, 22 which are fixed to the bars 20' by bolts 23, 23 passed through openings 23', and by means of the yokes 24, 24 and the set bolt 25 passed through one of the openings 22' in the connecting bar, the said bar is fixed to the bars 20. Thus the upper movable frame may be adjusted as to its length and fixed by the bolts 23 and 25, and the lower base frame being likewise adjustable, adapts the lifter device for different sized automobiles.

The two frames are connected at their ends by a series of pivoted links 26, 26, which are arranged preferably in sets of four as shown at each corner of the apparatus, although a less number of the links may be utilized if desired. The sets are arranged in pairs and pivoted to the frames as at 27, 27, so that the lower pivot is stationary and the upper pivot is adapted to swing upwardly with the lower pivot as a center. Thus when the chains 16, which are connected to U-bolts 28 attached to the front transverse bar 21, are wound upon the drum 11, the upper movable frame is drawn up and over to the right, swinging on its link pivots from the position of Fig. 2 to the position of Fig. 3.

At each corner of the frame is located a pivoted supporting blade 29, of metal, and adapted to swing on its pivot 30 to supporting position as in Figs. 1 and 3. Each of the blades is supported by means of a shorter blade 31 pivoted on the frame, and both the short and longer blades are adapted to fold down into the recess 32 when not in use. These blades or arms 29 are adapted to form seats for portions of the automobile to be supported, and as they are inclined it will readily be seen that the automobile or load supported upon the elevated upper frame is prevented from moving or sliding longitudinally of the frame.

In using the elevating or lifting device, the automobile is driven over the frame in its lowered position until in proper location with relation to the frame, and then the blades or arms 29 are raised to adjusted position under certain portions of the car. The handle 12 may be detached or not as required, but after the car is in position, the handle is of course placed in operative position and oscillated to wind the chains 16 on their drum. This action causes the upper frame and automobile to be lifted bodily until the links 26 stand upright with the right end of the upper frame against the bearing blocks 9, and the trip 15 prevents reverse or unwinding movement of the drum, thus holding the upper frame in rigid position with the automobile lifted from the ground or floor. By releasing the trip of course the car may be lowered to the floor.

From the above description taken in connection with my drawings it is evident that I have provided an apparatus which fulfils the conditions and performs the functions of a perfect device of this character.

What I claim is:—

In an automobile lifting device, the combination with an extensible base frame comprising end bars and attached side bars, and adjustable connecting bars attached to the adjoining ends of the side bars, of an extensible movable frame comprising end bars and attached side bars and adjustable connecting bars attached to the adjoining ends of the side bars, pivoted links connecting the two frames, a windlass supported on the base frame and operatively connected to the movable frame, abutments on the base frame to limit the movement of the movable frame, and retaining devices on the movable frame to hold a supported object when the movable frame is lifted.

In testimony whereof I affix my signature.

BIRD E. HENSLEY.

Copies of this patent may be obtained for five cents each, by addressing the "Commissioner of Patents, Washington, D. C."